United States Patent [19]
Shiraishi et al.

[11] Patent Number: 5,521,648
[45] Date of Patent: May 28, 1996

[54] IMAGE TRANSFORMING APPARATUS TO PROVIDE SPECIAL EFFECTS

[75] Inventors: Toshihiro Shiraishi; Katsuakira Moriwake, both of Kanagawa, Japan

[73] Assignee: Sony Corporation, Tokyo, Japan

[21] Appl. No.: 288,234

[22] Filed: Aug. 9, 1994

[30] Foreign Application Priority Data

Aug. 16, 1993 [JP] Japan ................................ 5-222782

[51] Int. Cl.$^6$ ................................................. H04N 5/262
[52] U.S. Cl. ........................................... 348/580; 348/578
[58] Field of Search ................................. ; 348/578, 580, 348/581, 582, 492; 382/293, 295, 298; H04N 5/262, 5/222

[56] References Cited

U.S. PATENT DOCUMENTS 5,070,465  12/1991  Kato et al. .
5,225,824   7/1993  Yamamoto et al. .

FOREIGN PATENT DOCUMENTS 0437074  7/1991  European Pat. Off. .

OTHER PUBLICATIONS

WPI Abstract No. 93–023134/03 corresp. to JP 4–351078 (Dec. 4, 1992).

Primary Examiner—David E. Harvey
Attorney, Agent, or Firm—William S. Frommer; Alvin Sinderbrand

[57] ABSTRACT

In an image transforming apparatus for performing the predetermined image transform for the image, the image formed by input video signal is stored in a memory, and the input video signal in the memory is read out in accordance with the predetermined read address data of the read address generating means, so that the special effect as if the image bursts is obtained. The random number generator is added to the read address generating means, and the extension of image and the value of random numbers to be added are controlled based on the data corresponding to the angle for the center of effect, so that the burst effect as if the picture elements scatter separately can be obtained.

4 Claims, 12 Drawing Sheets

IMAGE TRANSFORMING APPARATUS TO PROVIDE SPECIAL EFFECTS

BACKGROUND OF THE INVENTION

1. Field of the Invention

This invention relates to an image transforming apparatus, and more particularly, to an improvement of special effecting process which gives special effects to video signal.

2. Description of the Related Art

The conventional image transforming apparatus is disclosed, for example, in U.S. Pat. No. 5,070,465.

Heretofore, in this type of image transforming apparatus, input video signal is sequentially written in a predetermined area of a frame memory in accordance with write address outputted from a write address generating circuit, and data in the frame memory is read in accordance with read address data inputted from a read address generating circuit, thereby giving a variety of special effects to video signal and transforming the image to display.

Meanwhile, in this type of image transforming apparatus of read address control system, it has been difficult to add random numbers to an arbitrary picture element, and it has not been performed to give, for example, a special effect as if an image bursts radially from one point of a picture.

SUMMARY OF THE INVENTION

In view of the foregoing, an object of this invention is to provide an image transforming apparatus which can obtain special effects as if an image bursts.

The foregoing object and other objects of the invention have been achieved by the provision of an image transforming apparatus 10 which stores an image formed by input video signal S1 in a memory 11 and reads out the input video signal S1 in the memory 11 in accordance with read address signal S4 of predetermined read address generating means 13, thereby performing specified image transformation for the image, comprising: transform means 23 for transforming the read address (x, y) being expressed by orthogonal coordinates into polar coordinates data (r, θ); image extending means 30 for extending the polar coordinates data, which forms the image in accordance with the distance "r" from the center of image transform effect, toward the radial direction; random number adding means 31, 29 for adding predetermined random numbers to the polar coordinates data in accordance with the distance from the center of image transform effect of the radial direction; modulation amount changing means 24, 25, 26 for changing the modulation amount in the image extending means 30 and the random number adding means 31, 29 in accordance with angle θ for the center of image transform effect; and transform means 32, 33, 34, 35 for transforming the polar coordinates data transformed by the image extending means 30 and the random number adding means 31, 29 into orthogonal coordinates data (X, Y), in which the video signal is read out from the frame memory 11 in accordance with the read address data transformed into orthogonal coordinates data (X, Y), so that the burst effect is given to the image formed by the input video signal.

Further, in this invention, the image transforming apparatus 10 enables the magnifying ratio $C_V$ of burst effect to be variable.

Further, in this invention, the image transforming apparatus 10 enables the burst scale $T_S$ of burst effect to be variable.

Further, in this invention, the image transforming apparatus 10 enables the rotating angle $P_S$ of burst effect to be variable.

Further, in this invention, the image transforming apparatus 10 enables the aspect ratio $A_S$ of burst effect to be variable.

According to this invention described above, the random number generator which can control the gain input for each processing picture element is added to the read address generator, and the extension of image and the value of random numbers to be added are controlled based on the data corresponding to the angle for the center of effect, so that the image transforming apparatus which can obtain the burst effect as if the picture elements scatter separately, without a sense of incongruity further, can be realized.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
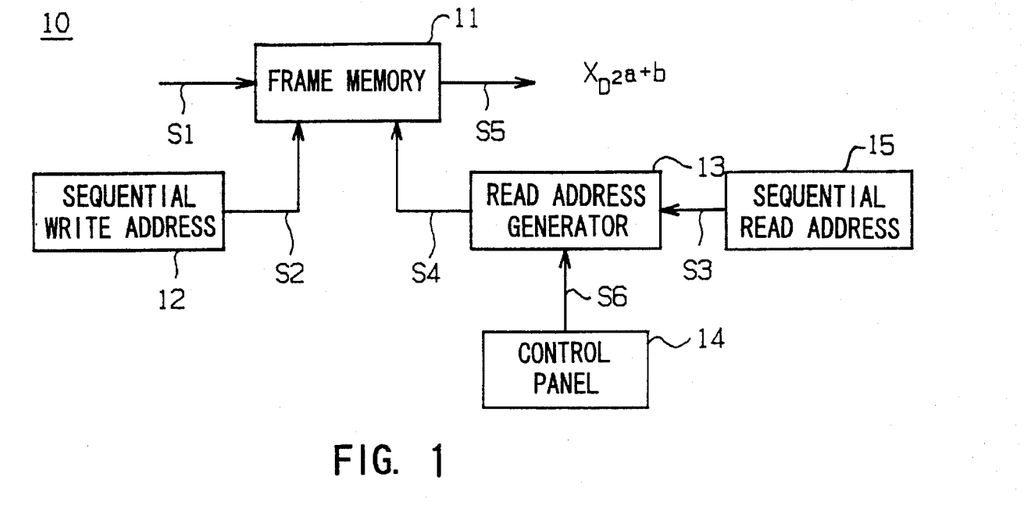
FIG. 1 is a block diagram showing one embodiment of an image transforming apparatus according to this invention.

Preferred embodiments of this invention will be described with reference to the accompanying drawings:

In FIG. 1, 10 generally shows an image transforming apparatus. In FIG. 1, digitalized input video signal S1 is written in a frame memory 11 in accordance with write address signal S2 sent from a sequential write address counter 12, in the state that the image does not change, that is, just as it is.

Further, read address signal S3 from a sequential read address counter 15 for generating sequential read address is supplied to a read address generator 13 for generating read address to read image data from the frame memory 11. The read address generator 13 changes the sequential read address signal S3 in accordance with parameter setting signal S6 sent from a control panel 14, and supplies the changed read address signal S4 to the frame memory 11. Therefore, output video signal S5, which is read out from the frame memory 11 in accordance with the read address signal, becomes an image that the predetermined transformation is performed for the input video signal S1. In addition, control line is omitted, and sequential write address counter 12 and sequential read address counter 15 are controlled by the CPU 37 in FIG. 13.

Figure 2:
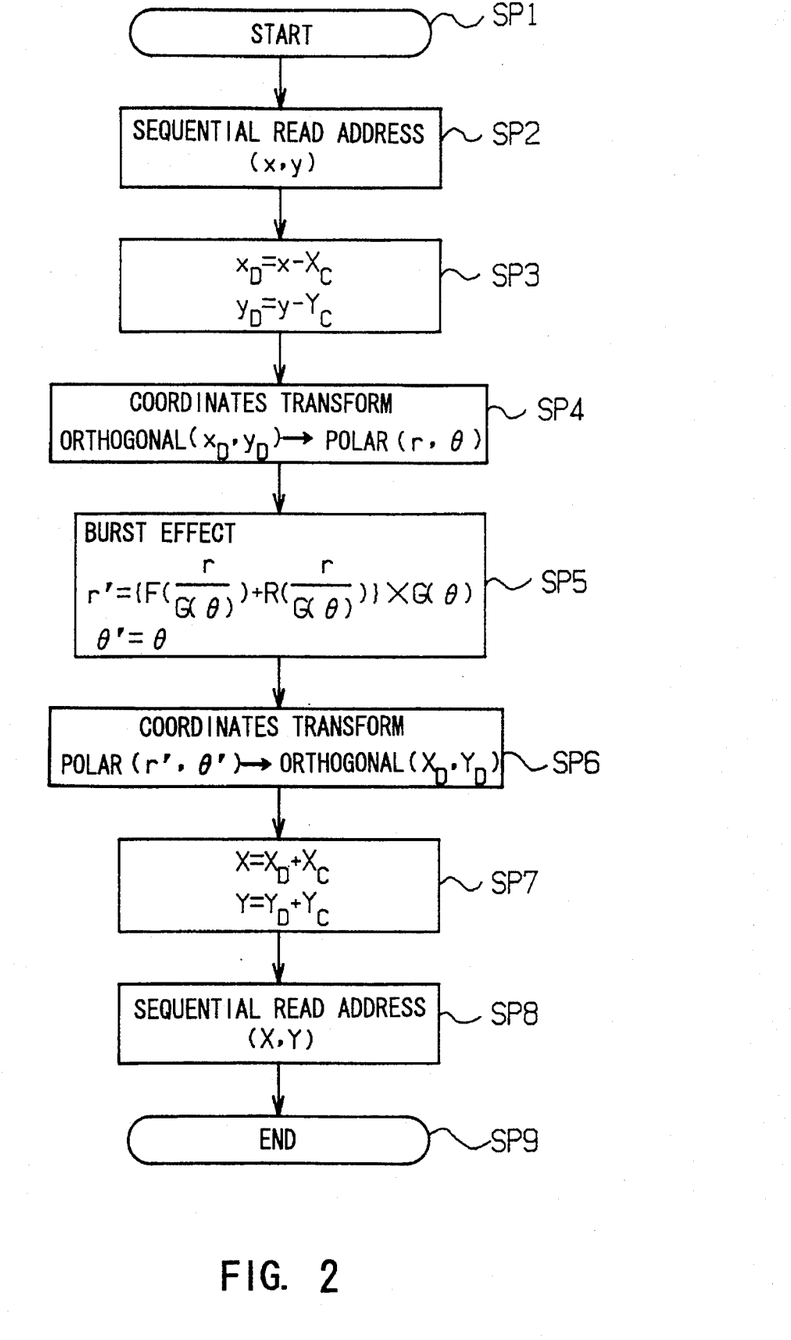
FIG. 2 is a flowchart showing the burst effect read address generating procedure according to this invention.

Here, FIG. 2 shows burst effect read address generating procedure in the read address generator 13. The read address generator 13 enters the procedure from step SP1, and inputs the read address signal S3 specified in orthogonal coordinates system (x, y) at step SP2, and then proceeds to the following step SP3.

Here, the center of burst is $(X_C, Y_C)$ for the sequential input read address (x, y) to the read address generator 13. The read address generator 13 obtains the distances $x_D$ and $y_D$ from the center of burst $(X_C, Y_C)$ to the read address (x, y) at step SP3. Then, at step SP4, on the basis of the distances $x_D$ and $y_D$, the distance "r" from the center of burst $(X_C, Y_C)$ and angle θ are obtained by the following equations:

$$r = \sqrt{x_D^2 + y_D^2} = \sqrt{(x - X_C)^2 + (y - Y_C)^2} \quad (1)$$

$$\theta = \tan^{-1}\left(\frac{y_D}{x_D}\right) \quad (2)$$

Thereby, transforming the orthogonal coordinates $(x_D, y_D)$ into the polar coordinates (r, θ).

Further, the read address generator 13, at step SP5, calculates (r', θ) by the relative formulae represented by the following equations:

$$r' = \left\{ F\left(\frac{r}{G(\theta)} + R\frac{r}{G(\theta)}\right) \right\} \times G(\theta) \quad (3)$$

$$\theta' = \theta \quad (4)$$

as the relative formula to realize the burst effect in the polar coordinates (r, θ).

Here, G(θ) function in the equation (3) is a pattern function which prescribes the form of burst (the beginning form to scatter). For example, in case of forming the pattern A as shown in FIG. 3, when the radius of standard circle S is "$R_S$" and the radius of pattern A at the angle θ is "$R_P$", G(θ) function becomes the cycle function represented by the following equation:

$$G(\theta) = \frac{R_P}{R_S} \text{ provided that } (0 < \theta < 2 \times \pi) \quad (5)$$

Figure 4A:
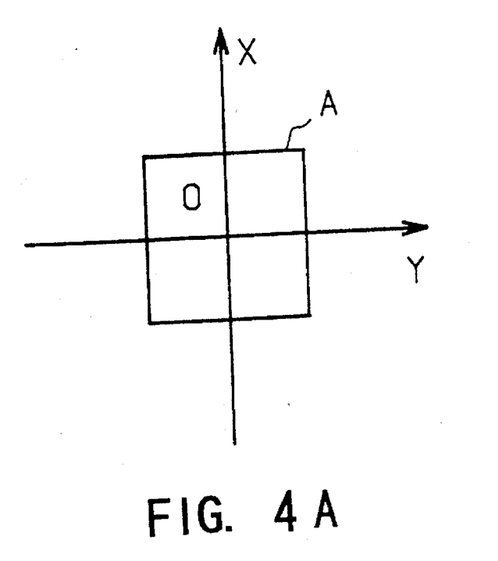
FIGS. 4A to 4C are schematic diagrams showing the relation between the pattern function and the output image.
Figure 4B:
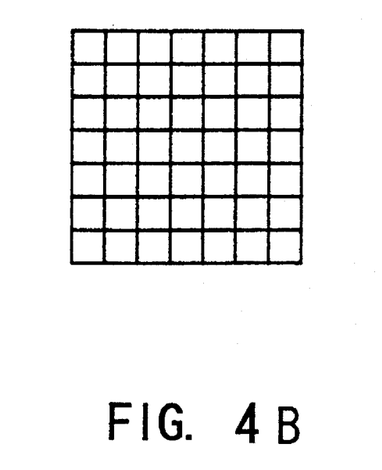
Figure 4C:
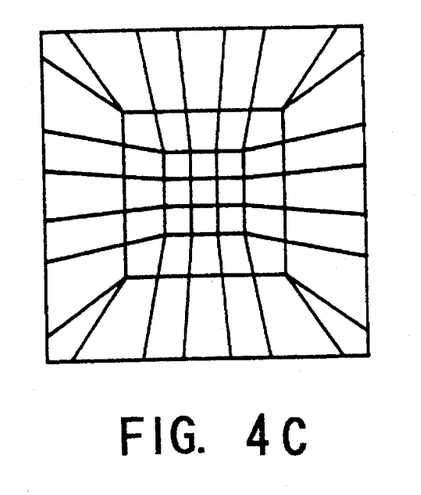

Here, as shown in FIGS. 4A to 4C, when the pattern A (FIG. 4A) is formed by the cycle function G(θ), the type of burst is prescribed by the pattern A, so that the input image as shown in FIG. 4B is transformed into the output image as if it radially spreads from the origin being centered as shown in FIG. 4C.

Figure 3:
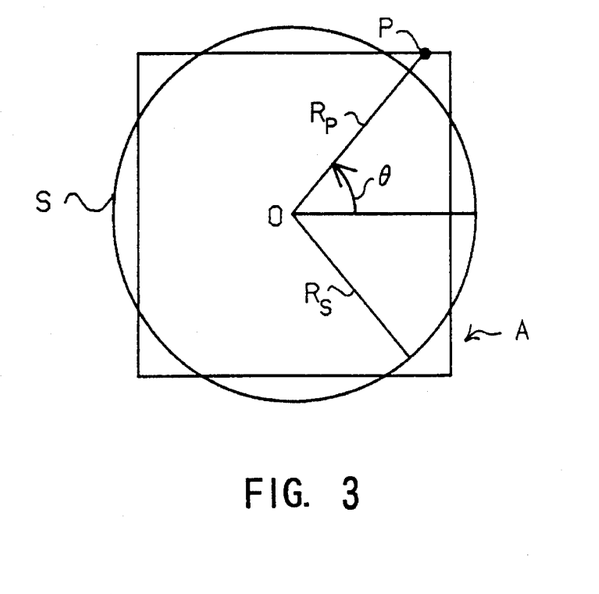
FIG. 3 is a schematic diagram explaining the pattern function G(θ)
Figure 5A:
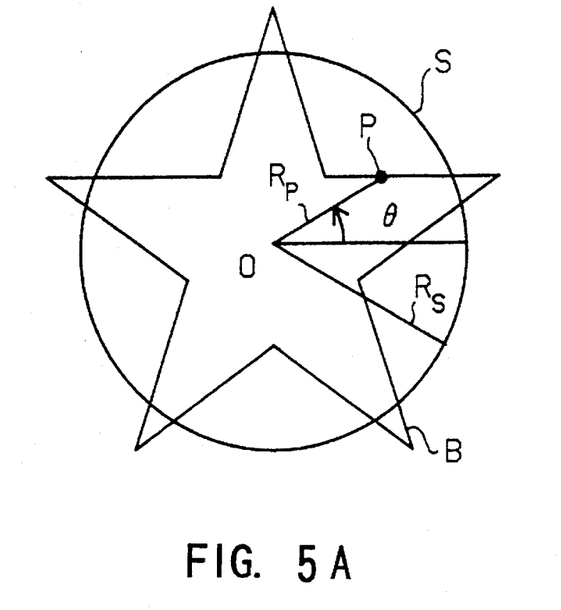
FIGS. 5A and 5B are curvilinear diagrams showing the example of star pattern and heart pattern.
Figure 5B:
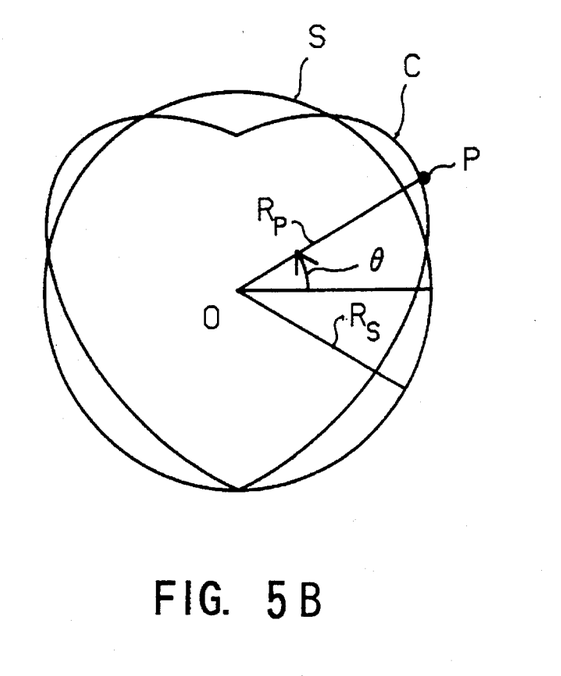

Further, the star pattern B and the heart pattern C as shown in FIGS. 5A and 5B can be formed by the function which prescribes the pattern of burst, similar to the case of FIG. 3.

Further, by transforming G(θ) function into the following equation:

$$G'(\theta) = G(\theta + P_S) \quad (6)$$

the rotation of form of burst can be controlled by the rotating angle $P_S$.

Further, by transforming G(θ) function into the following equation:

$$G'(\theta) = M(\theta + P_S) \times G(\theta + P_S + H(\theta + P_S)) \quad (7)$$

the form of burst can be controlled by the rotating angle $P_S$ and the aspect ratio $A_S$ of the form of burst.

Figure 6:
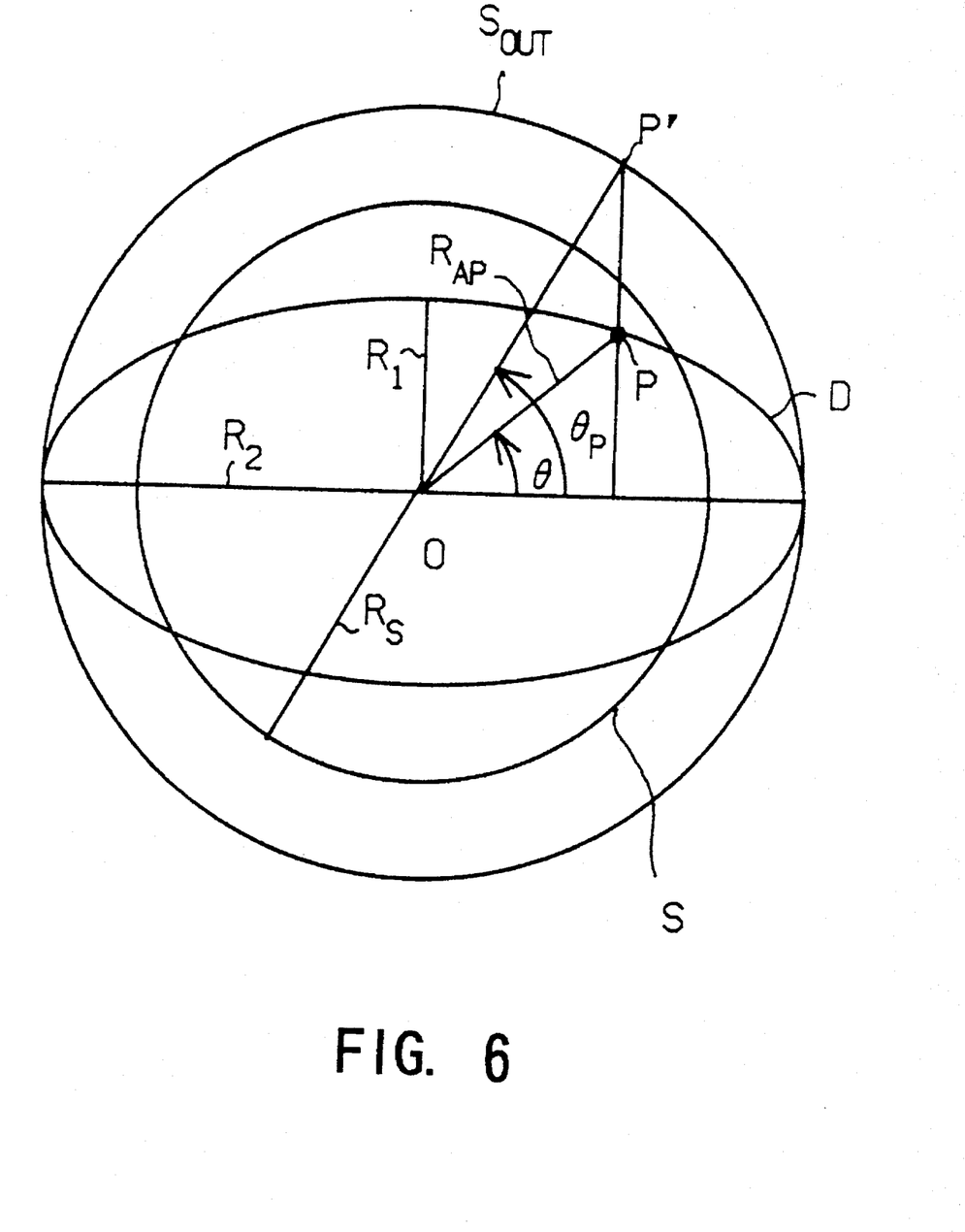
FIG. 6 is a curvilinear diagram showing the outline of aspect correction function.

However, M(θ) and H(θ) are aspect correcting functions to correct the aspect. When the radius of X-axis of aspect correction pattern D is "$R_2$", the radius of Y-axis of aspect correction pattern D is "$R_1$", the radius of the standard circle S of pattern function G(θ) is "$R_S$", and the distance between the center O at the angle θ and the point P on the pattern D is "$R_{AP}$", the aspect correcting functions M(θ) and H(θ) are represented by the following equations:

$$M(\theta) = \frac{R_{AP}}{R_S} \quad (8)$$

$$H(\theta) = \theta_P - \theta \quad (9)$$

However, the aspect ratio $A_S$ is represented by the following equation:

$$A_S = \frac{R_1}{R_2} \quad (10)$$

Figure 7A:
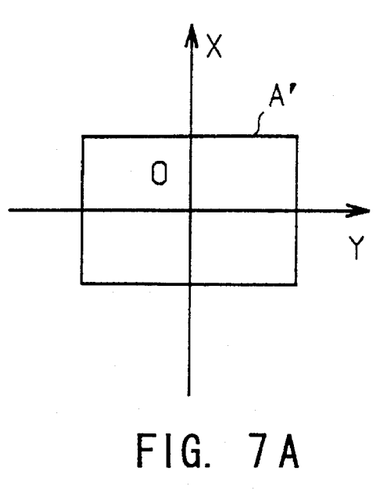
FIGS. 7A to 7C are schematic diagrams showing the pattern after aspect correction and the output image.
Figure 7B:
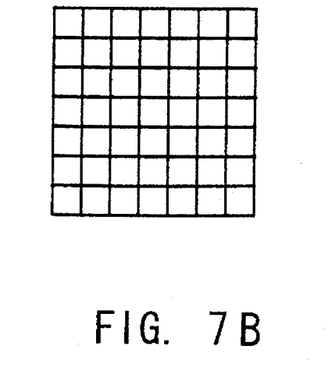
Figure 7C:
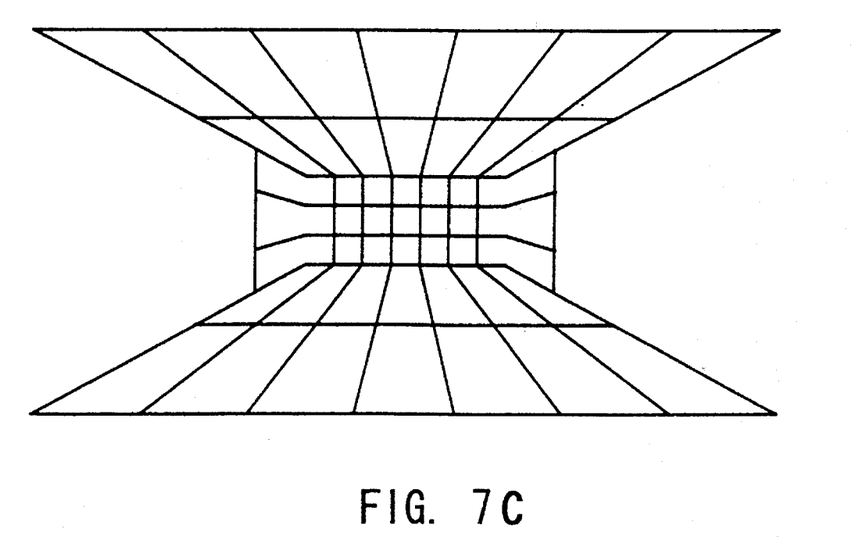

As a result, as shown in FIGS. 7A to 7C, the pattern A of a regular square which prescribes the form of burst described above regarding FIGS. 4A to 4C is transformed like the pattern A' (FIG. 7A) by the aspect correction pattern D, and the form of burst is prescribed by the pattern A', so that the input image as shown in FIG. 7B is transformed into the output image as if it widely and radially spreads toward the horizontal direction from the origin being centered, as shown in FIG. 7C.

Figure 8A:
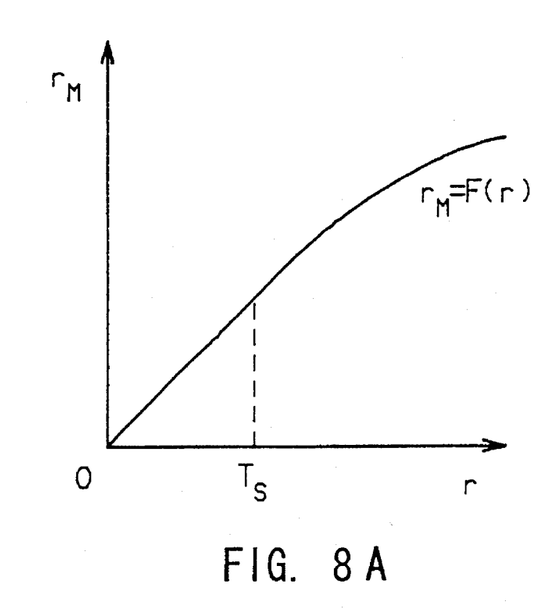
FIGS. 8A to 8C are schematic diagrams showing the relation between the function F(r) in pattern A and the output image.
Figure 8B:
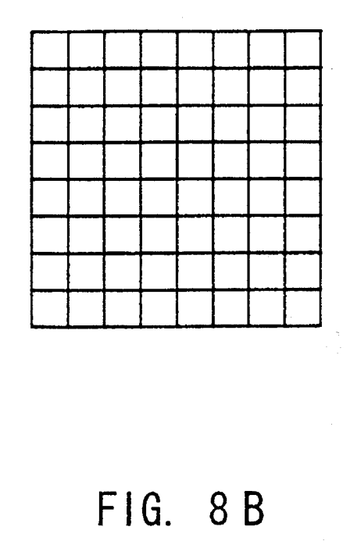
Figure 8C:
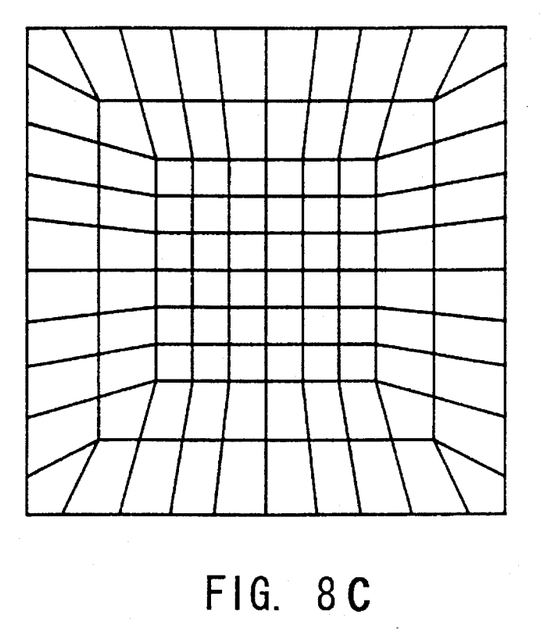
Figure 9A:
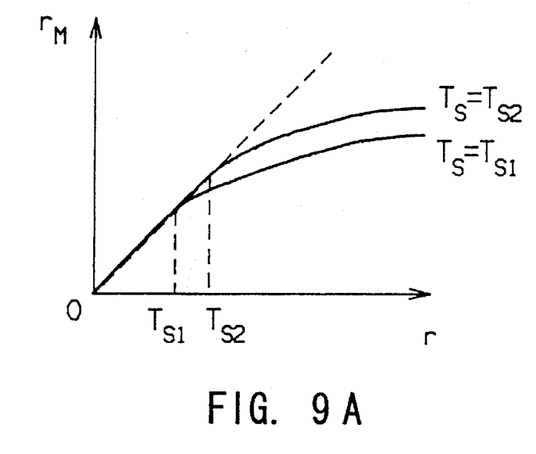
FIGS. 9A to 9D are schematic diagrams showing the relation between the function F(r) depending on $T_S$ value change and the output image.
Figure 9B:
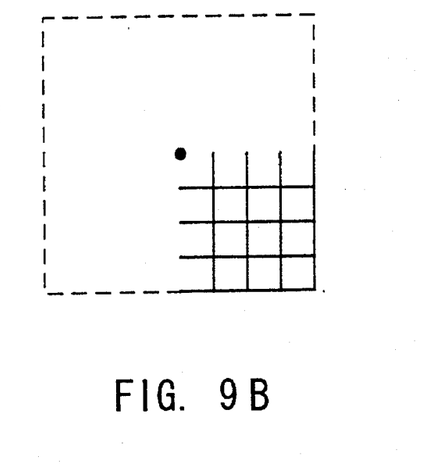
Figure 9C:
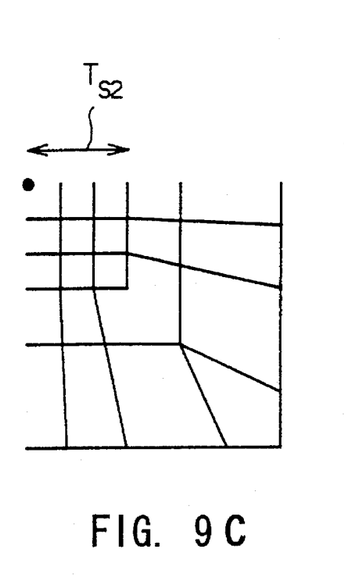
Figure 9D:
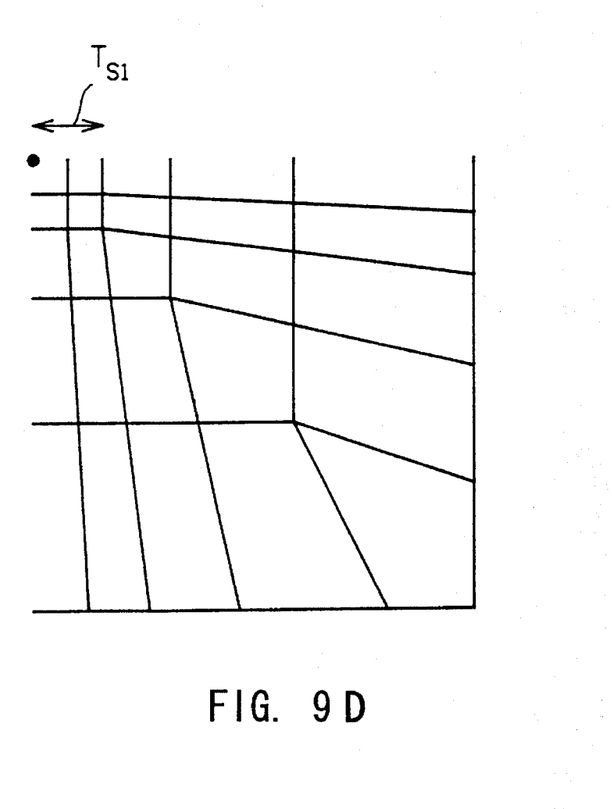
Figure 10A:
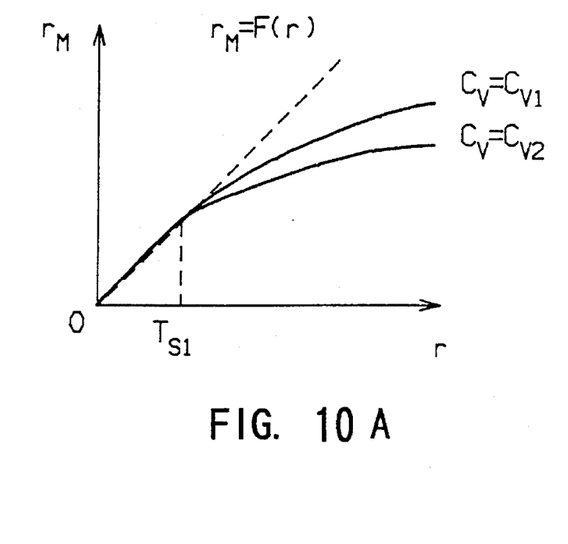
FIGS. 10A to 10D are schematic diagrams showing the relation between the function F(r) depending on $C_V$ value change and the output image.
Figure 10B:
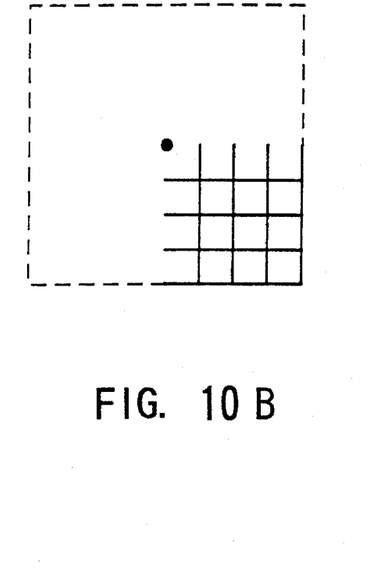
Figure 10C:
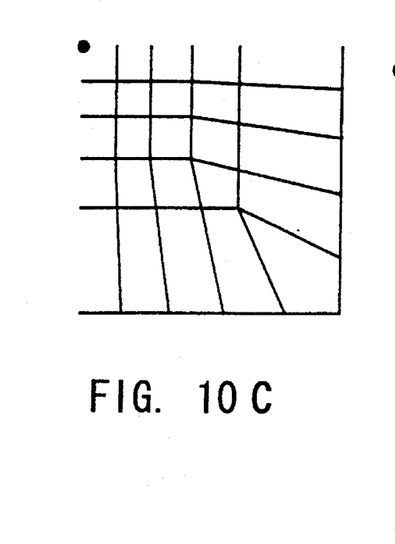
Figure 10D:
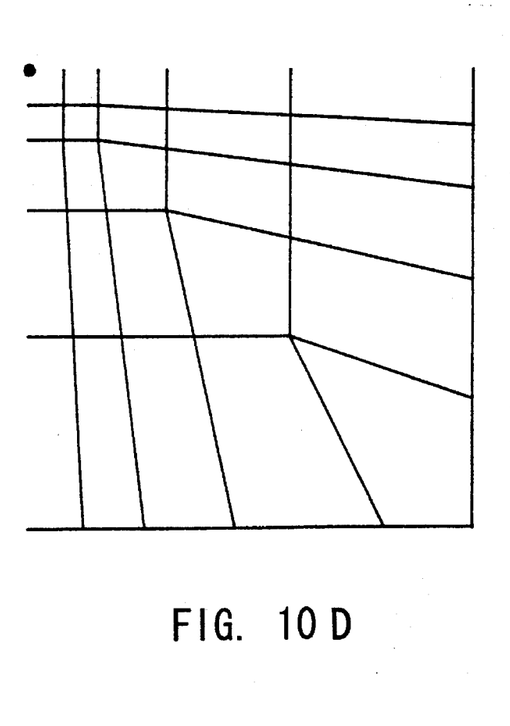

Further, in the equation (3), F(r) function is the function for prescribing the aspect of burst, and is the monotonous decreasing function that linear differential coefficient (inclination) changes from "1" to "0", as shown in FIG. 8A. At this time, the input image shown in FIG. 8B is transformed into the output image shown in FIG. 8C.

In this case, referring to FIG. 8A, changing the position $T_S$ where the linear differential coefficient changes from "1" enables to change the burst starting radius. More specifically, as shown in FIGS. 9A to 9D, when the position $T_S$ where the linear differential coefficient changes from "1" changes from $T_{S2}$ to $T_{S1}$ (FIG. 9A), the output image obtained by giving the burst effect to the input image (FIG. 9B) is changed in its burst starting radius, from the state shown in FIG. 9C to the state shown in FIG. 9D.

On the contrary, in FIG. 8A, changing the degree of decreasing $C_V$ of linear differential coefficient enables to change the magnifying ratio of burst. More specially, as shown in FIGS. 10A to 10D, when the degree of decreasing $C_V$ of linear differential coefficient is changed from $C_{V1}$ to $C_{V2}$ (FIG. 10A), the output image obtained by giving the burst effect to the input image (FIG. 10B) is changed in its magnifying ratio of burst, that is, the moving distance of each picture element from the state shown in FIG. 10C to the state shown in FIG. 10D.

Figure 11A:
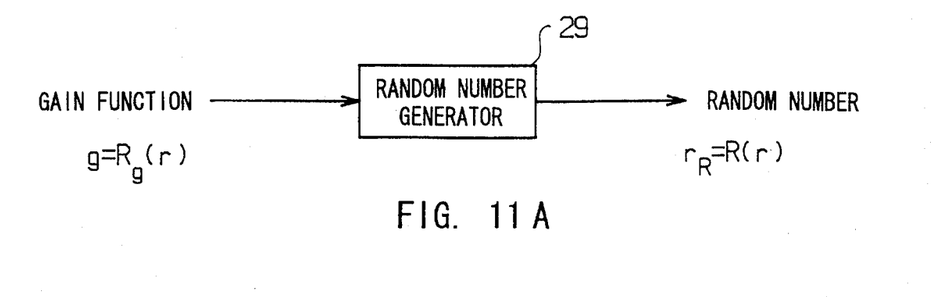
FIGS. 11A to 11C are schematic diagrams showing the outline of the operation of random number generator.
Figure 11B:
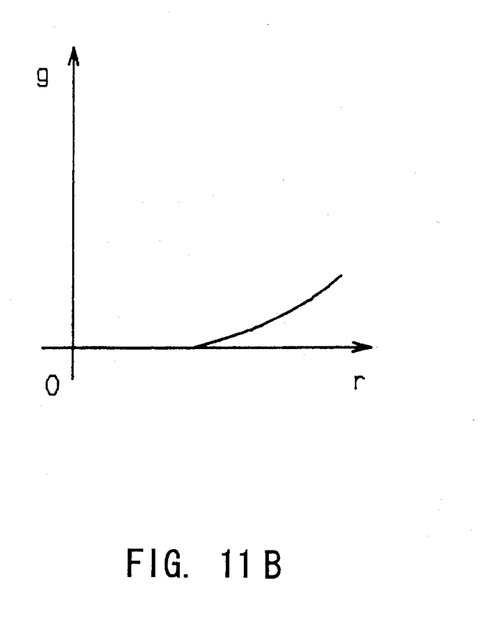
Figure 11C:
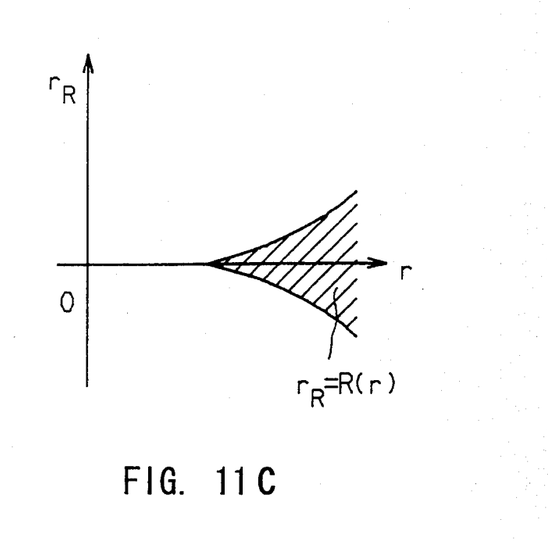

Further, in the equation (3), R(r) function is the function to realize the burst effect as if an image is scattered by the burst, and as shown in FIGS. 11A to 11C, the output random numbers from a random number generator 29 (FIG. 11A) provided within the read address generator 13 (FIG. 1) is used.

Figure 12A:
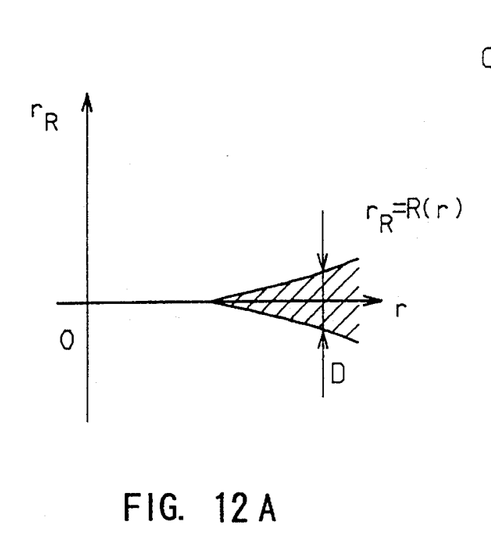
FIGS. 12A to 12C are schematic diagrams showing the relation between R(r) function and the output image.
Figure 12B:
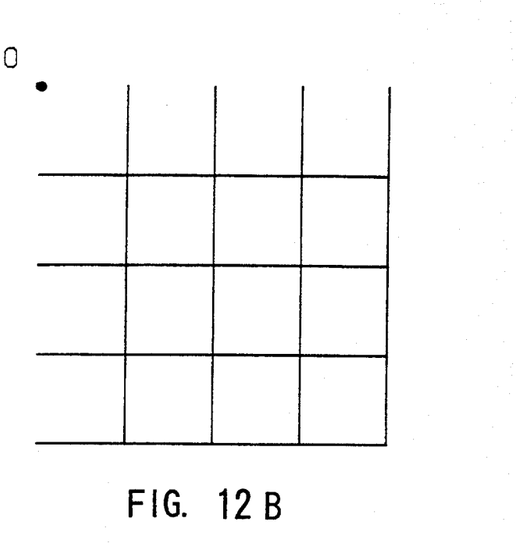
Figure 12C:
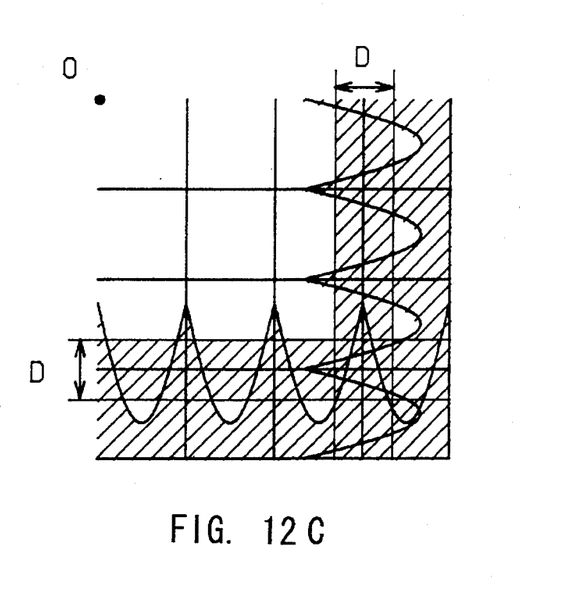

The size (absolute value) of the output random number $r_R=R(r)$ of the random number generator 29 (FIG. 11C) can be controlled by gain function $g=R_g(r)$ (FIG. 11B) to be inputted to the random number generator 29. As a result, as shown in FIGS. 12A to 12C, when the input image (FIG. 12B) is changed by R(r) function (FIG. 12A), as shown in FIG. 12C, the output image can obtain the effect such as picture elements scatter at the area of slant line.

Further, as shown in the equation (3), by linking the gain function with F(r) function and by controlling by the parameter such as $T_S$, $C_V$, and the amplification factor $G_S$ of gain function, etc., the burst effect being further realistic can be realized.

In this way, the read address generator 13 calculates the burst effect at step SP5 of the procedure, thereafter, proceeds to the following step SP6 and calculates the following equations:

$$X_D = r' \times \cos(\theta') \quad (11)$$

$$Y_D = r' \times \sin(\theta') \quad (12)$$

to the polar coordinates (r', θ'), so that the polar coordinates (r', θ') is transformed into the orthogonal coordinates ($X_D$, $Y_D$). Further, at step SP7, the constant $X_C$, $Y_C$ are respectively added to the orthogonal coordinates ($X_D$, $Y_D$), so as to return the center position as the processing after the burst effect and obtain the read address (X, Y). Then, at step SP8, video signal is read from the frame memory 11 based on the read address (X, Y) to obtain the effect such as the image bursts and scatters from the center of effect toward the outside, and at step SP9, the procedure terminates.

Figure 13:
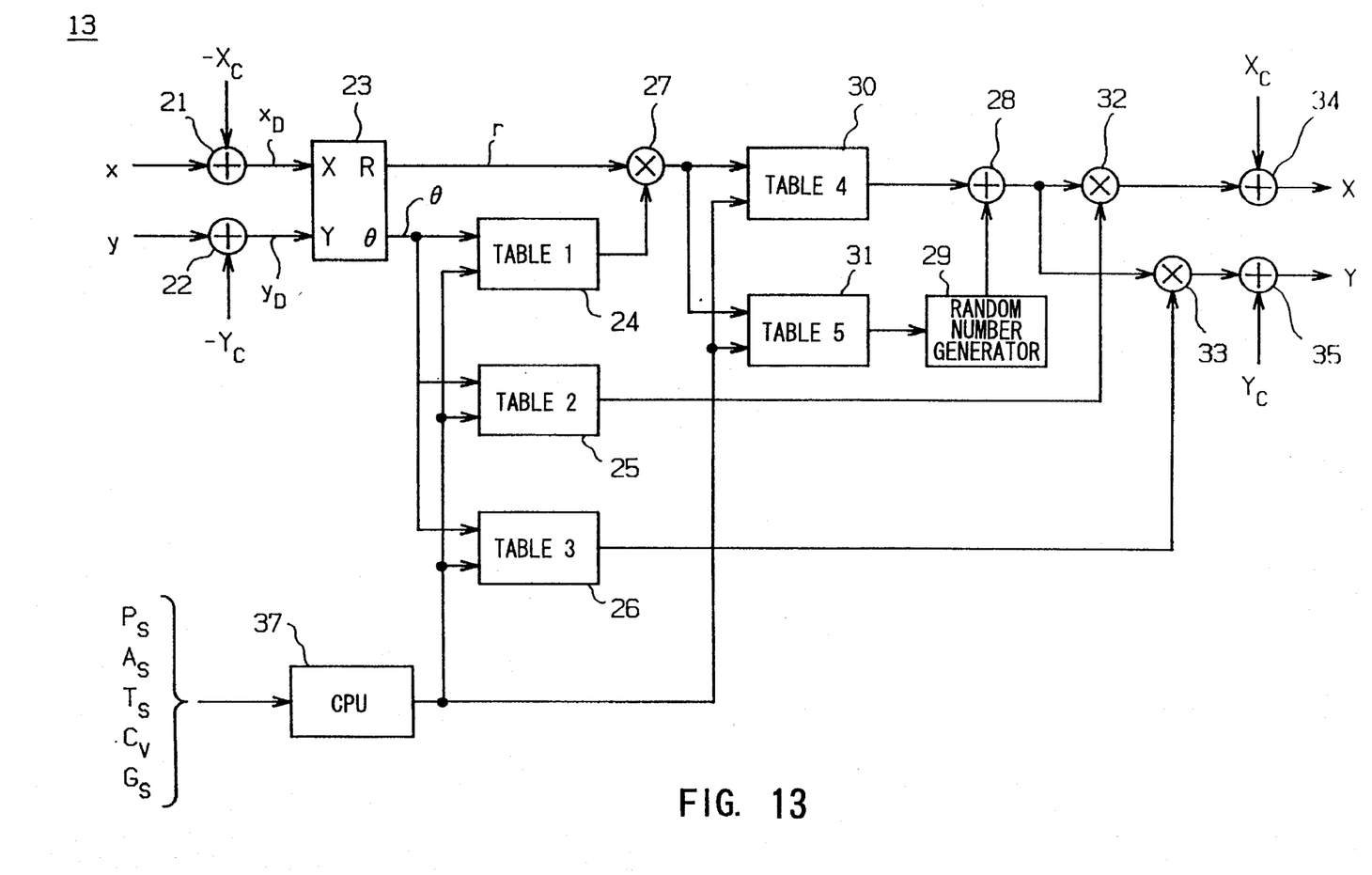
FIG. 13 is a block diagram showing the construction of the read address generator for burst effect.

Here, FIG. 13 shows the construction of the read address generator 13. $-X_C$ is added to sequential read address x at an adding circuit 21 to supply them to a coordinates transforming circuit 23. Also, $-Y_C$ is added to sequential read address y at an adding circuit 22 to supply them to the coordinates transforming circuit 23.

In the coordinates transforming circuit 23, the angle θ from the center of burst transformed into the polar coordinates is inputted to a RAM 24, a RAM 25, and a RAM 26. Here, in accordance with the above equations (3) and (4), data set in the RAM 24 becomes 1/G(θ), data set in the RAM 25 becomes the following equation:

$$G(\theta) \times \cos(\theta') = G(\theta) \times \cos(\theta) \quad (13)$$

data set in the RAM 26 becomes the following equation:

$$G(\theta) \times \sin(\theta') = G(\theta) \times \sin(\theta) \quad (14)$$

data set in a RAM 30 becomes F(r) function which prescribes the state of burst, and data set in a RAM 31 becomes gain input function $R_g(r)$ for the random number generator 29 to generate random number R(r) for realizing the effect such as an image scatters by burst.

Data of the RAMs 24, 25, 26, 30, and 31 are set in the CPU 37, on the basis of the rotating angle $P_S$ of burst inputted from the control panel 14, the aspect ratio $A_S$, the burst starting radius $T_S$, the magnifying ratio of burst $C_V$, and the amplification factor $G_S$ of gain function. Besides, the center of burst ($X_C$, $Y_C$) can be also inputted by the control panel 14.

Further, the distance "r" from the center of burst transformed into the polar coordinates in the coordinates transforming circuit 23 is supplied to a multiplying circuit 27 to multiply with the output of the RAM 24, and is then supplied to the RAM 30 and RAM 31. Therefore, data to be inputted to the RAM 30 and RAM 31 are data in accordance with the angle θ for the center of burst. The output data of the RAM 25 and RAM 26 are respectively supplied to multiplying circuits 32 and 33.

The RAM 30 calculates data regarding the state of burst from the parameter outputted from the CPU 37 and the output of the multiplying circuit 27, and supplies them to an adding circuit 28. The RAM 31 obtains gain input $g=R_g(r)$ for the random number generator 29 to generate the random number R(r) from the parameter inputted via the CPU 37 and the output of the multiplying circuit 27, and supplies them to the random number generator 29.

The random number generator 29 obtains R(r) function to obtain the scatter effect due to burst, based on the gain input from the RAM 31, and supplies them to the adding circuit 28. The adding circuit 28 adds the output of the RAM 30 and the output of the random number generator 29 to supply to multiplying circuits 32 and 33.

The multiplying circuit 32 multiples the output of the adding circuit 28 and the output of the RAM 25 to supply to the following adding circuit 34. The adding circuit 34 adds the burst center position data $X_C$ to the output of the multiplying circuit 32, so that the read address X for burst effect is obtained.

Also, the multiplying circuit 33 multiples the output of the adding circuit 28 and the output of the RAM 26 to supply to the following adding circuit 35. The adding circuit 35 adds the burst center position data $Y_C$ to the output of the multiplying circuit 33, so that the read address Y for burst effect is obtained.

The read address generator 13 performs calculation processing based on the distance "r" from the center of burst, so that the extension amount for each picture element can be controlled in accordance with the distance "r" from the center of burst effect, and simultaneously, the size of random number to be added to the distance "r" can be changed in accordance with the distance "r" from the center of burst effect.

Further, the read address generator 13 performs the calculation processing based on the angle θ of each picture element for the center of burst, so that the control of extension amount and the size of random number to be changed, in accordance with the distance "r" from the center of burst, can be also changed by the angle θ for the center of burst effect.

Therefore, the scatter state of picture elements can be controlled by the distance "r" from the center of burst effect and the angle θ.

With the above constitution, the random number generator 29 is added to the read address generator 13, and the gain input for the added random number generator 29 can be controlled for each processing picture element, so that the burst effect such as the picture elements scatter can be obtained without a sense of incongruity.

Furthermore, the gain control for the random number generator 29 is performed by pattern function G(θ) depending upon θ of polar coordinates and the aspect correcting functions M(θ), H(θ), so that the extension amount of burst can be controlled by the angle for the center of burst, and for example, the effect such as a television image having the aspect ratio 4:3 bursts uniformly can be obtained.

In the embodiment discussed above, the burst effect is obtained on the two-dimensional plane. However, this invention is not only limited to this, but the sequential read address (X, Y) to be inputted to the read address generator 13 may be multiplied by three-dimensional matrix.

More specifically, when the read address multiplied by three-dimensional matrix are $x_{3D}$ and $Y_{3D}$, and $a_{11}$ to $a_{33}$ are three-dimensional matrix, the read address ($x_{3D}$, $y_{3D}$) represented by the following equations:

$$x_{3D} = \frac{a_{11} \times x + a_{12} \times y + a_{13}}{a_{31} \times x + a_{32} \times y + a_{33}} \quad (15)$$

$$y_{3D} = \frac{a_{21} \times x + a_{22} \times y + a_{23}}{a_{31} \times x + a_{32} \times y + a_{33}} \quad (16)$$

may be inputted to the read address generator 13.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An image transforming apparatus for processing a special effect to an input video signal, comprising:

memory means for storing said input video signal;

write address generating means for generating sequential write address data represented by orthogonal coordinates so that said video signal is stored in said memory means;

read address generating means for generating sequential read address data represented by orthogonal coordinates;

first transform means for transforming said sequential read address data into polar coordinates data represented by polar coordinates;

image extending means for selectively extending said polar coordinates in a radial direction in accordance with a distance from a center data;

random number means for modulating said extended polar coordinates data in accordance with the distance from said center data;

modulation amount control means for controlling modulation amount of said image extending means and said random number means on the basis of an orientation angle under the polar coordinates; and second transform means for transforming the polar coordinates data modulated by said image extending means and said random number means into orthogonal coordinates data;

wherein said input video signal is read from said memory means on the basis of said orthogonal coordinates data so that the video signal read from said memory means is given a burst effect.

2. The image transforming apparatus according to claim 1, wherein:

said image extending means extends only those polar coordinates data for which the distance is over a predetermined value, said predetermined value being changeable.

3. An image transforming apparatus for processing a special effect to an input video signal, comprising:

memory means for storing said input video signal;

write address generating means for generating sequential write address data represented by orthogonal coordinates so that said video signal is stored in said memory means;

read address generating means for generating sequential read address data represented by orthogonal coordinates;

first transform means for transforming said sequential read address data into polar coordinates data represented by polar coordinates;

image extending means for selectively extending said polar coordinate data in a radial direction in accordance with a distance from a center data;

random number means for modulating said extended polar coordinates data in accordance with the distance from said center data;

modulation amount control means for controlling modulation amount of said image extending means on the basis of an orientation angle under the polar coordinates; and second transform means for transforming the polar data modulated by said image extending means and said random number means into orthogonal coordinate data;

wherein said input video signal is read from said memory means on the basis of said orthogonal coordinate data so that the video signal read form said memory means is given a burst effect.

4. An image transforming apparatus for processing a special effect to an input video signal, comprising:

memory means for storing said input video signal;

write address generating means for generating sequential write address data represented by orthogonal coordinates so that said video signal is stored in said memory means;

read address generating means for generating sequential read address data represented by orthogonal coordinates;

first transform means for transforming said sequential read address data into polar coordinates data represented by polar coordinates;

image extending means for selectively extending said polar coordinate data in a radial direction in accordance with a distance from a center data;

random number means for modulating said extended polar coordinates data in accordance with the distance from said center data;

modulation amount control means for controlling modulation amount of said random number means on the basis of an orientation angle under the polar coordinates; and second transform means for transforming the polar data modulated by said image extending means and said random number means into orthogonal coordinate data;

wherein said input video signal is read from said memory means on the basis of said orthogonal coordinate data so that the video signal read from said memory means is given a burst effect.

* * * * *